(12) United States Patent
Wawrowski et al.

(10) Patent No.: US 12,041,500 B2
(45) Date of Patent: Jul. 16, 2024

(54) SYSTEM AND METHOD FOR DYNAMIC OPTIMIZATION OF RADIO ACCESS NETWORK SITE

(71) Applicant: MOTOROLA SOLUTIONS, INC., Chicago, IL (US)

(72) Inventors: Mariusz Wawrowski, Wawrzenczyce (PL); Robert Mrowiec, Liszki (PL); Wojciech Szczypta, Cracow (PL); Robert Orzechowski, Cracow (PL); Grzegorz Ochmanek, Przytkowice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 318 days.

(21) Appl. No.: 17/454,835

(22) Filed: Nov. 15, 2021

(65) Prior Publication Data

US 2023/0156545 A1    May 18, 2023

(51) Int. Cl.
*H04W 36/08* (2009.01)
*H04W 16/28* (2009.01)
*H04W 36/00* (2009.01)

(52) U.S. Cl.
CPC ........... *H04W 36/08* (2013.01); *H04W 16/28* (2013.01); *H04W 36/0072* (2013.01)

(58) Field of Classification Search
None
See application file for complete search history.

(56) References Cited

U.S. PATENT DOCUMENTS 6,567,670 B1   5/2003   Petersson
9,319,957 B1 *   4/2016   Singh .................. H04W 36/304
(Continued)

FOREIGN PATENT DOCUMENTS

| CN | 110036677 A | 7/2019 |
|---|---|---|
| CN | 10635824 B | 4/2020 |
| JP | 2002077042 A | 3/2002 |

OTHER PUBLICATIONS

CATT: "Solution for overload avoidance with the help of NWDAF output", 3GPP Draft; S2-188198_Overload Avoidance With the Help of NWDAF Output, ; F-06921 Sophia-Antipolis Cedex, vol. SA WG2, No. Sophia Antipolis, France; Aug. 20, 2018-Aug. 24, 2018 Aug. 14, 2018 (Aug. 14, 2018), XP051537127, Retrieved from the Internet: URL:http://www.3gpp.org/ftp/tsg%5Fsa/WG2%5FArch/TSGS2%5F128BIS%5FSophia%5FAntipolis/Docs/S2%2D188198%2Ezip [retrieved Aug. 14, 2018] the whole document.
The International Search Report and the Written Opinion, corresponding patent application No. PCT/US2022/047526, filed: Oct. 24, 2022, mailed Feb. 21, 2023, all pages.

*Primary Examiner* — Frantz Bataille (57) ABSTRACT

Techniques for dynamic optimization of radio access network sites are provided. A wireless communications infrastructure identifies that a piece of user equipment (UE) is connected to a base station associated with a current Radio Access Network (RAN) site that does not have sufficient backhaul resources to support the piece of UE. A target RAN site that has sufficient backhaul resources to support the piece of UE is identified. The target RAN site associated with at least one base station. A Radio Frequency (RF) signal transmitted from at least one of the base station associated with the current RAN site and the at least one base station associated with the target RAN site is modified. The modification causes the piece of UE to handover from the base station associated with the current RAN site to the at least one base station associated with the target RAN site.

20 Claims, 4 Drawing Sheets

(56) References Cited

U.S. PATENT DOCUMENTS

| | | |
|---|---|---|
| 10,945,172 B2 | 3/2021 | Jeon et al. |
| 2017/0013504 A1 | 1/2017 | Smith et al. |
| 2018/0132145 A1 | 5/2018 | Cao et al. |
| 2019/0090165 A1* | 3/2019 | Huang-Fu ............. H04W 36/30 |
| 2022/0210789 A1* | 6/2022 | Bellamkonda ........ H04W 88/06 |

* cited by examiner

SYSTEM AND METHOD FOR DYNAMIC OPTIMIZATION OF RADIO ACCESS NETWORK SITE

BACKGROUND

When deploying a low cost 5th Generation (5G) and/or Long Term Evolution (LTE, 4G) systems, coverage is often the primary concern. If a user is not within the coverage area of a radio frequency (RF) base station, it is impossible for the user to connect to the system and communicate (i.e. make voice and/or data calls, etc.). In order to ensure adequate RF coverage, the system may include a low cost Radio Access Network (RAN) to ensure adequate RF coverage of the area in which the system is deployed.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Given that RF coverage is often times a primary concern when deploying low cost networks, it is often the case that cost savings cannot come at the expense of reducing RF coverage. One possible source of cost savings is in the capacity of the transport network (i.e. the backhaul network) that carries traffic from the base station back to the core network. For example, a base station is generally connected to a router, which in turn provides transport capabilities between the base station and the core network.

The overall cost of the Radio Access Network (RAN) may be directly associated with the throughput of the transport network. By selecting elements (e.g. routers, firewalls, network links, etc.) with lower throughput capabilities (e.g. slower speeds, reduced bandwidth, etc.), costs may be reduced without affecting the RF coverage of the system. This cost savings may come at the expense of the capacity of the RAN. For example, the base station may be able to provide sufficient RF coverage to a number of users whose traffic could exceed the capabilities of the transport network.

As long as the load offered to the base station does not exceed the capabilities of the backhaul network, the system may operate normally. A problem arises when the load offered exceeds the capabilities of the backhaul network. For example, consider a case where several pieces of user equipment (e.g. cell phones, data terminals, etc.) are being provided RF coverage by a single base station or multiple bases stations serviced by the same backhaul facilities and the load offered by those pieces of user equipment exceed the capabilities of the backhaul network. Such a situation could arise through simple happenstance (e.g. many users just happen to be in the given base station coverage area) or because of an unusual event in the coverage area of the base station (e.g. an incident, such as a terrorist attack, has occurred causing responders to flood the area of the incident).

The techniques described herein overcome this problem by modifying RF signals of the base station and/or nearby base stations to cause at least one of the pieces of user equipment to disconnect from the current base station that is lacking in backhaul transport capabilities and to reconnect to a target base station that is not limited by backhaul transport capabilities. The decision to cause such a handoff between base stations is based on the capabilities of the backhaul transport network serving the base stations, and not the RF capacity of the base station. Thus, handoffs can be triggered even when there is sufficient RF capacity from the current base station.

A method is provided. The method includes identifying, by a wireless communications infrastructure, that a piece of User Equipment (UE) is connected to a base station associated with a current Radio Access Network (RAN) site that does not have sufficient backhaul resources to support the piece of UE. The method also includes identifying a target RAN site that has sufficient backhaul resources to support the piece of UE, the target RAN site associated with at least one base station. The method also includes modifying a Radio Frequency (RF) signal transmitted from at least one of the base station associated with the current RAN site and the at least one base station associated with the target RAN site to cause the piece of UE to handover from the base station associated with the current RAN site to the at least one base station associated with the target RAN site.

In one aspect, modifying the RF signal comprises using beamforming to reduce RF signal received by the piece of UE from the base station associated with the current RAN site. In one aspect, modifying the RF signal comprises using beamforming to increase the RF signal received by the piece of UE from the at least one base station associated with the target RAN site. In one aspect, modifying the RF signal comprises using beamforming to reduce RF signal received by the piece of UE from the base station associated with the current RAN site and using beamforming to increase the RF signal received by the piece of UE from the at least one base station associated with the target RAN site.

In one aspect, the piece of UE is identified using at least one of traffic load of the backhaul resources, topology of the network resources, location of the piece of UE, priority level of the piece of UE, priority level of an incident associated with the piece of UE, and a communications group associated with the piece of UE. In one aspect, the modifying the RF signal comprises at least one of antenna electrical tilt, antenna mechanical tilt, and transmit power. In one aspect, the current RAN site is not limited by RF resources.

A system is provided. The system includes a processor and a memory coupled to the processor. The memory contains a set of instructions thereon that when executed by the processor cause the processor to identify, by a wireless communications infrastructure, that a piece of User Equipment (UE) is connected to a base station associated with a current Radio Access Network (RAN) site that does not have sufficient backhaul resources to support the piece of UE. The instructions further cause the processor to identify a target RAN site that has sufficient backhaul resources to support the piece of UE, the target RAN site associated with at least one base station. The instructions further cause the processor to modify a Radio Frequency (RF) signal transmitted from at least one of the base station associated with the current RAN site and the at least one base station associated with the target RAN site to cause the piece of UE to handover from the base station associated with the current RAN site to the at least one base station associated with the target RAN site.

In one aspect, modifying the RF signal comprises instructions to use beamforming to reduce RF signal received by the piece of UE from the base station associated with the current RAN site. In one aspect, modifying the RF signal comprises instructions to use beamforming to increase the RF signal received by the piece of UE from the at least one base station associated with the target RAN site. In one aspect, modifying the RF signal comprises instructions to use beamforming to reduce RF signal received by the piece of UE from the base station associated with the current RAN site and use beamforming to increase the RF signal received by the piece of UE from the at least one base station associated with the target RAN site.

In one aspect, the piece of UE is identified using at least one of traffic load of the backhaul resources, topology of the network resources, location of the piece of UE, priority level of the piece of UE, priority level of an incident associated with the piece of UE, and a communications group associated with the piece of UE. In one aspect, the RF signal comprises at least one of antenna electrical tilt, antenna mechanical tilt, and transmit power. In one aspect, the current RAN site is not limited by RF resources.

A non-transitory processor readable medium containing a set of instructions thereon is provided. The instructions, that when executed by a processor cause the processor to identify, by a wireless communications infrastructure, that a piece of User Equipment (UE) is connected to a base station associated with a current Radio Access Network (RAN) site that does not have sufficient backhaul resources to support the piece of UE. The instructions further cause the processor to identify a target RAN site that has sufficient backhaul resources to support the piece of UE, the target RAN site associated with at least one base station. The instructions further cause the processor to modify a Radio Frequency (RF) signal transmitted from at least one of the base station associated with the current RAN site and the at least one base station associated with the target RAN site to cause the piece of UE to handover from the base station associated with the current RAN site to the at least one base station associated with the target RAN site.

In one aspect, the modifying the RF signal comprises instructions to use beamforming to reduce RF signal received by the piece of UE from the base station associated with the current RAN site. In one aspect, the modifying the RF signal comprises instructions to use beamforming to increase the RF signal received by the piece of UE from the at least one base station associated with the target RAN site. In one aspect, the modifying the RF signal comprises instructions to use beamforming to reduce RF signal received by the piece of UE from the base station associated with the current RAN site and use beamforming to increase the RF signal received by the piece of UE from the at least one base station associated with the target RAN site.

In one aspect, the piece of UE is identified using at least one of traffic load of the backhaul resources, topology of the network resources, location of the piece of UE, priority level of the piece of UE, priority level of an incident associated with the piece of UE, and a communications group associated with the piece of UE. In one aspect, the modifying the RF signal comprises at least one of antenna electrical tilt, antenna mechanical tilt, and transmit power.

Further advantages and features consistent with this disclosure will be set forth in the following detailed description, with reference to the figures.

Figure 1:
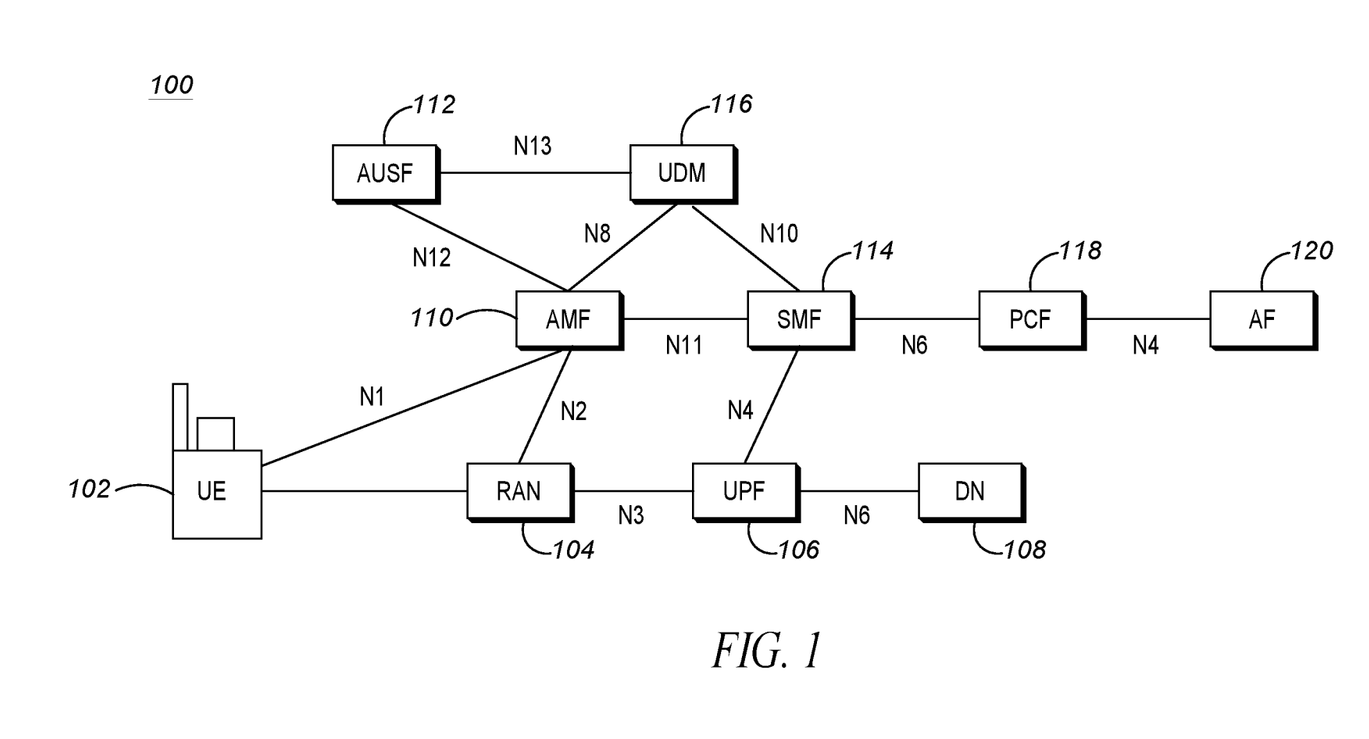
FIG. 1 illustrates an example of a 5G system in which the dynamic optimization of radio access network site techniques described herein may be implemented.

FIG. 1 illustrates an example of a 5G system in which the dynamic optimization of radio access network site techniques described herein may be implemented. FIG. 1 illustrates a 5G system 100 in accordance with some embodiments. 5G system 100 may be capable of delivering data using enhanced characteristics compared with 5G systems, such as streaming of up to about 1 Gbps, file download speeds of up to about 20 Gbps, latencies as low as about 1 ms, and device connection densities of about 106 devices/km$^2$, for example. 5G system 100 includes multiple 5G network functions (NFs). A network function can be implemented as a discrete network element on a dedicated hardware, as a software instance running on dedicated hardware, or as a virtualized function instantiated on an appropriate platform, e.g., dedicated hardware or a cloud infrastructure. Although not shown in FIG. 1, RAN 104 may be connected with an evolved packet core (EPC) (or a RAN connected with the EPC), that includes mobility management entities (MME), serving gateways (S-GWs), and packet data network gateways (P-GWs), among others. The connection of a RAN site, including base stations, to the EPC via a router and other networking equipment is described in further detail with respect to FIG. 2. RAN 104 may be 5G base stations (referred to as gNodeBs or gNBs) 104. gNB 104 may also include, or be connected to, an eNB or a general non-3GPP access point, such as that for Wi-Fi. gNB 104 may be a standalone gNB or a non-standalone gNB, e.g., operating in Dual Connectivity (DC) mode as a booster controlled by an evolved nodeB (eNB) through an X2 or Xn interface.

In 5G system 100, the control plane (CP) functionalities and the user plane (UP) functionalities are separated. This separation permits independent deployment and adaptation of the 5G system for each operator using the 5G system.

As shown, 5G system 100 includes gNB 104 in communication with UEs 102 as well as a number of elements specific to the architecture of 5G system 100 (5G core network (CN)). These 5G CN elements include a User Plane Function (UPF) 106, an Authentication Server Function (AUSF) 112, an Access and Mobility Management Function (AMF) 110, a Session Management Function (SMF) 114, a Unified Data Management (UDM) 116, a Policy Control Function (PCF) 118, and an Application Function (AF) 120. The UPF 106 may be connected to a Data network (DN) 108, which provides, for example operator services, Internet access, or other 3rd party services. The various elements are connected by the point-to-point reference points (e.g., N1, N2) shown.

UE 102 may generate, encode and encrypt uplink transmissions to, and decode and decrypt downlink transmissions from, gNB 104. A similar functionality may be provided by the entity in communication with UE 102. UPF 106 may be connected with a data network, with which UE 102 may communicate, UE 102 transmitting uplink data to or receiving downlink data from the data network. UPF 106 may, in addition to being the point of connection to DN 108, provide routing and forwarding of packets to UE 102. UPF 106 may also provide QoS handling as well as Deep Packet Inspection (DPI) for packet inspection and classification. UPF 106 may also integrate Firewall and Network Address Translation (NAT) functionality and act as an anchor for Intra RAT and Inter-RAT handovers.

AMF 110 may provide, among other functions, UE-based authentication, authorization, mobility management, security context, connection and registration management, and non-access stratum (NAS) signaling termination. SMF 114 may be responsible for, among others, session management (including establishment, modification, and termination of a session, and NAS signaling termination of the session), providing Dynamic Host Configuration Protocol (DHCP) functionality, allocation and management of IP addresses to UE 102, and providing notification of downlink data to UE 102. SMF 114 may also select and control UPF 106 for data transfer, including providing the traffic steering configuration. SMF 114 may thus act as the interface for all user plane communication and may determine how the policy and charging for these services is applied. SMF 114 may be associated with a single session of UE 102 or multiple 5G sessions of UE 102. Note that while UE 102 may have multiple sessions, each session may be allocated to a different SMF 114, thereby allowing each session to be individually managed. As a consequence, the functionalities of each session may be independent of each other.

AF 120 may provide information on the packet flow to the PCF 118 responsible for policy control to support a desired QoS. AF 120 may also provide access to the network exposure function (NEF) (not shown), which permits exposure of the services and capabilities provided by the network functions in a secure manner to an external (non-3GPP) application. The NEF provisions the control plane parameters and manages packet flow descriptors (protocol, server-side IP and port number). Similarly, the network repository function (NRF) (not shown) in the network maintains the network profile of UE 102 and available network function instances, as well as supporting the service discovery function, thereby permitting the network functions to discover each other. Also, a Network Slice Selection Function (NSSF) in the network may select the Network Slice instances to serve UE 102, determine allowed Network Slice Selection Assistance Information (NSSAI) and determine the appropriate AMF 110 to serve UE 102. The NSSF may thus redirect traffic in the network to the appropriate network slice, which may be defined for different classes of subscribers.

AUSF 112 may store data for UE authentication, including keys, acting as an authentication server for UE 102. UDM 116 may similarly store the UE subscription data (including generation of Authentication and Key Agreement (AKA) credentials for UE 102), supporting access authorization of UE 102 as well as subscription management for UE 102.

PCF 118 may provide policy rules for the control plane functions for UE 102, including mobility and session management policies. To this end, PCF 118 may use the packet flow information to determine the appropriate control plane policies for proper operation of AMF 110 and SMF 114. PCF 118 may access subscription information for policy decisions and support the 5G QoS policy and charging control functions. PCF 118 thus takes care of network policies to manage network behavior. PCF 118 obtains the subscription information from UDM 116 and interfaces to SMF 114 to manage the session contexts and to AMF 110 to manage the mobility context. PCF 118 triggers the UE route selection policy (URSP) which enables the UE to determine how a particular application should be handled in the context of an existing or new PDU (Packet Data Unit) session. The URSP may provide the UE with information about a new network slice configuration; the slice ID of the network slice may thus be communicated from PCF 118.

Note that various specialized servers are not shown in FIG. 1 for convenience. For example, in some embodiments a PTT server may be present to provide floor control in an OMA-POC or MCPTT session. When a PTT (hard or soft) button on a UE that has subscribed to the OMA-POC or MCPTT session is actuated, the UE may transmit a request for permission in the OMA-POC or MCPTT session to the PTT server using, for example, a real-time transport protocol (RTP) message. If the PoC session is not occupied, there are no other UEs transmitting when the PTT button is actuated, the PTT server may transmit an acceptance message to the UE, which can then begin transmitting encoded audio and/or video data (which may be compressed) to the PTT server over the RTP or IP protocol. The PTT server may then send the audio and/or video data to one or more other UEs that have subscribed to the PoC session using unicast, multicast, or broadcast communications.

In some embodiments, UEs may be partitioned into separate work groups. In some land mobile radio (LMR) cases, each group may be assigned a particular frequency (channel) for communication between the UEs in the group. The channel used by each group may be unique or may be shared with another group. In the latter case, a group ID may be used during transmission to enable distinguishing between groups for transmissions.

In other trunked LMR systems, a pool of frequencies may be shared among all groups, allowing more flexibility in resource usage for the pool among the groups as some groups with more communications are able to expand channel usage while other groups with fewer communications are able to use the channels less often. That is, when a group member activates the PTT button, a call request that is associated with the group ID may be transmitted to the PTT server on a control channel. The control channel may be a particular frequency that remains idle until a call request is transmitted. Each UE may monitor the control channel for a new call notification. The PTT server may receive the call request and in response assign a specific channel for the requested group call and send the assignment to UEs associated with the group ID. This may permit the group UEs to move from the control channel to the assigned channel.

Although FIG. 1 has been described in terms of a 5G system, it should be understood that this is simply for ease of description rather than for purposes of limitation. The techniques described herein are equally applicable to other networks (e.g. LTE/4G systems, 3G systems, etc.). For example, in a 4G system, the basic functionalities provided and described above would also be provided, although by slightly differently named elements. For example, the base station in a 4G network may be referred to as a eNodeB, rather than a gNodeB, despite providing very similar RF coverage functions. What should be understood is that the techniques described herein may be utilized with any network topology in which the RF resources are connected to the core network using a collection of routers, firewalls, gateways, etc.

Figure 2:
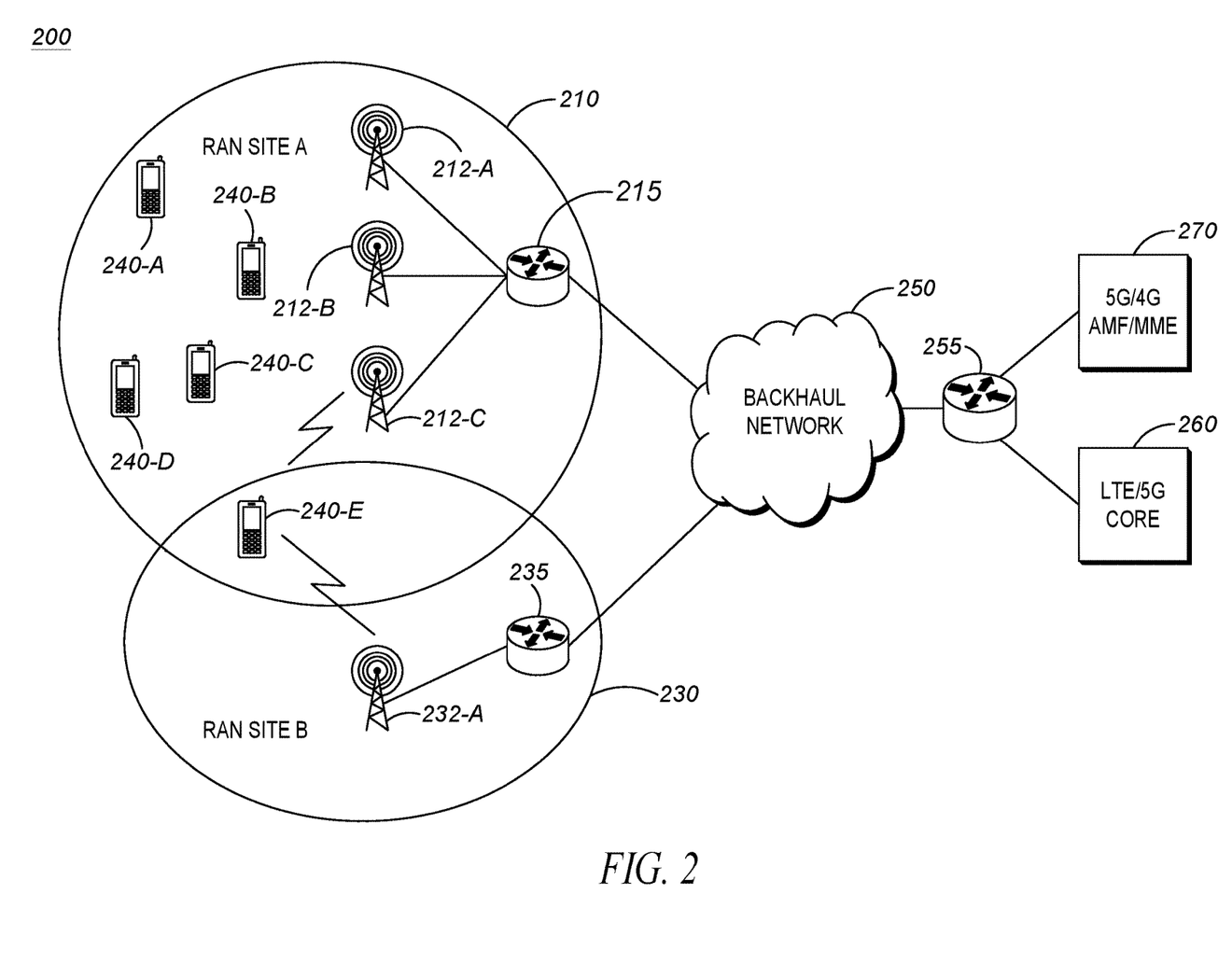
FIG. 2 illustrates an example of a RAN including RAN sites having single and multiple base stations.

FIG. 2 illustrates an example of a RAN including RAN sites having single and multiple base stations. FIG. 2 is a more detailed example RAN 104 described with respect to FIG. 1. RAN 200 may include multiple RAN site A 210 and RAN site B 230. Although two RAN sites are shown, this is for purposes of ease of description only and not by way of limitation. An actual implementation may have any number of RAN sites.

A RAN site may, in this high level description, be described by one or more base stations coupled to networking equipment (including network links) to allow the base stations to connect to the core network for both user data and control information. In the example, shown, RAN site A 210 includes 3 base stations 212-A, 212-B, and 212-C, whereas RAN site B 230 includes a single base station 232-A.

The base stations 212, 232 are not limited to any particular RF technology. For example, in the case of a 5G network, the base stations may be gNodeBs that provide RF coverage according to the 5G standards. In the case of a 4G network, the base stations 212, 232 may be eNodeBs that provide RF coverage. The techniques described herein are suitable for use with any base station RF technology currently available and created in the future. What should be understood is that the base stations provide RF capacity and coverage, independent of backhaul capacity. It should further be noted that a particular RAN site may have base stations that operate with different RF technologies (e.g. provide simultaneous 4G and 5G coverage, etc.).

Each RAN site 210, 230 may be connected to the backhaul network 250 with networking equipment 215, 235. The networking equipment may include routers, switches, hubs, firewalls, network address translation devices, or any other type of networking equipment that may be utilized to allow base stations 212, 232 to connect to the LTE/5G core 260 and/or control functions 270, described in further detail below. The same backhaul network 250 may be used for both control messages and user data. Networking equipment 255 (e.g. routers, switches, fire walls, NAT translation devices, etc.) may be used to route control messages to the AMF/MME 270 and user traffic to the LTE/5G core 260.

As mentioned above, in some cases network designers may opt to use lower capacity networking equipment 215, 235 in order to reduce the cost of deploying a system. For example, the base stations 212 may be such that at maximum capacity, they are able to support a certain level of traffic from an RF perspective. For example, the base stations may be able to support multiple pieces of user equipment (UE) 240 A-E that are capable of producing a certain amount of traffic that is to be transported via the backhaul network 250 to the network core 260. For example, the base stations 212 of Ran Site A 210 may be able to support a combined offered load of 500 Megabits per second (Mbps) from all the base stations together. UE 240 are generally equivalent to UE 102 described with respect to FIG. 1.

To save costs, the system designer may have used lower cost networking elements 215. For example, the system designers may have designed network components 215 such that they can only support a 400 Mbps connection to the backhaul network. The system would operate with full efficiency as long as the traffic from the base stations 212 does not exceed 400 Mbps, as the offered load from the base stations would not exceed the capabilities of the backhaul networking components.

Situations may arise wherein the number of pieces of user equipment 240 within a RAN site may, in combination, produce more traffic than can be handled by the networking components 215. For example, some type of emergency situation may occur within RAN site A 210, that causes a large number of pieces of UE 240 to attempt to connect with the LTE/5G Core network 260 via the backhaul network 250.

The techniques described herein attempt to overcome the problem of too much traffic being offered to a single RAN site by creating conditions that cause a piece of UE to move from a base station associated with a RAN site that is limited in the amount of backhaul capacity to a to a RAN site that has sufficient backhaul capacity. For example, assume that initially, all pieces of UE 240 A-E are connected to bases stations 212 via RF communications, offering a total load of 500 Mbps. Assume that networking equipment 215 is only able to support 400 Mbps of traffic. As such, all of the traffic from RAN site A 210 cannot be supported by the site.

Also assume that RAN site B 230, only has a single base station 232-A and that there are currently no pieces of UE associated with the base station. Because no UE is associated with RAN site B, the networking equipment 235 is fully available.

The circles around RAN site A 210 and RAN site B 230 depict the RF coverage area of each of those sites. In other words, a piece of UE within the circle is able to establish a RF connection with at least one of the base stations within that RAN site. As shown, UE 240-E, although currently connected to base station 212-C, is within the coverage area of RAN site B 230. If the piece of UE 240-E was able to disconnect from base station 212-C this would cause the amount of traffic within RAN site A 210 to drop by an amount equal to the traffic offered by UE 240-E. For example, if UE 240-E was offering 100 Mbps of traffic to RAN site A, moving to RAN site B would cause the total amount of traffic present with RAN site A to drop to 400 Mbps, which is within the capabilities of the networking components 215.

The techniques described herein cause the UE to switch from a RAN site with insufficient backhaul resources (i.e. the current RAN site) to one with sufficient backhaul resources (i.e. the target RAN site) by modifying the RF signal coming from the current RAN site, the target RAN site, or both, to cause the piece of UE to switch between RAN sites. Currently, most communications systems of the type described (e.g. 4G, 5G, etc.) allow for handover from one base station to another based on RF conditions and changes in those RF conditions. Normally, those changes are caused by mobility of the UE. For example, as a piece of UE moves away from a base station, the RF signal from that base station decreases due to distance, while at the same time the RF signal from a different base station may increase. At some point the system may decide to cause the UE to switch from one base station to the other.

The techniques described herein may alter the RF coverage of the current and target base stations such that they trigger a handoff of a piece of UE from the current base station associated with the current RAN to a base station associated with a target RAN.

For example, in the case of a 5G/4G system the AMF/MME function 270 may cause the base stations to modify RF signal produced by each base station to create conditions that would be favorable to cause a piece of UE to switch from one base station to another. This would be similar to what happens when a piece of UE is moving between RAN sites, but it should be understood that no actual movement of the UE is needed. Instead, the AMF/MME function 270 may determine that from a backhaul capacity perspective, it would be beneficial for the UE to move from the current RAN site to the target RAN site. In the present example, it may be determined that it would be beneficial for the piece of UE 240-E to move from RAN site A 210, base station 212-C, which is limited in backhaul capacity to RAN site B 230, base station 232-A, which is not limited in backhaul capacity.

The AMF/MME function 270 may manipulate the RF signal from each of the base stations to cause a handover from the current RAN site to the target RAN site. Both 4G and 5G systems implement RF beam forming technology in order to provide more focused coverage of a specific piece of UE. In one example implementation, beam forming techniques may be used to reduce the amount of RF power from the direction of the current base station towards the identified piece of UE. For example, the AMF/MME 270 may utilize the current UE location as well as the base station location to cause the base station 212-C to reduce the amount of RF energy that is directed to the piece of UE 240-E. This reduction in RF energy from the direction of base station 212-C may cause UE 240-E to handover to a different base station (e.g. base station 232-A).

In another example, AMF/MME 270 may cause base station 232-A to manipulate its RF signals toward UE 240-E to cause the UE to handover to base station 232-A. For example, using beam forming, the amount of signal directed to UE 240-E from base station 232-A may be increased to make base station appear to be a better selection for handover than the currently serving base station. Again, this manipulation of the RF signal coverage is done to encourage handover based on the availability of backhaul resources, not due to actual RF coverage constraints.

It should further be understood that the RF signals from both the current RAN site 210 and the target RAN site 230 could be modified at the same time. For example, RF beams from the current RAN site 210 could be modified to reduce RF signal in the direction of the UE 240-E, while at the same time RF beams from the target RAN site 230 may be increased in the direction of UE 240-E. The end result being that the current RAN site becomes less desirable from an RF signal standpoint while the target RAN site becomes more desirable.

Beamforming techniques are continuously improving. Each subsequent generation of beamforming techniques is an improvement over the previous one. It is expected that this progression will continue, such that the techniques described herein are usable as beam forming technology improves and provides the ability to even better tailor the signal directed at the UE from either the current base station or the target bases station.

Although beamforming has been described as a mechanism for modifying the RF signal received by the UE, it should be understood that this is only one example, technique. Other techniques can include adjusting the electrical tilt of the antenna, resulting in an improved or attenuated signal being received by the base station. As yet another technique, a simple alteration in transmit power, without including beam forming could be used. For example, transmit power from the current base station may be reduced while transmit power from the target base station may be increased. What should be understood is that the techniques described herein modify RF signals from the current RAN site, the target RAN site, or both to cause a piece of UE to perform a handover from a RAN site with insufficient backhaul capabilities to one which has sufficient backhaul capabilities.

Figure 3:
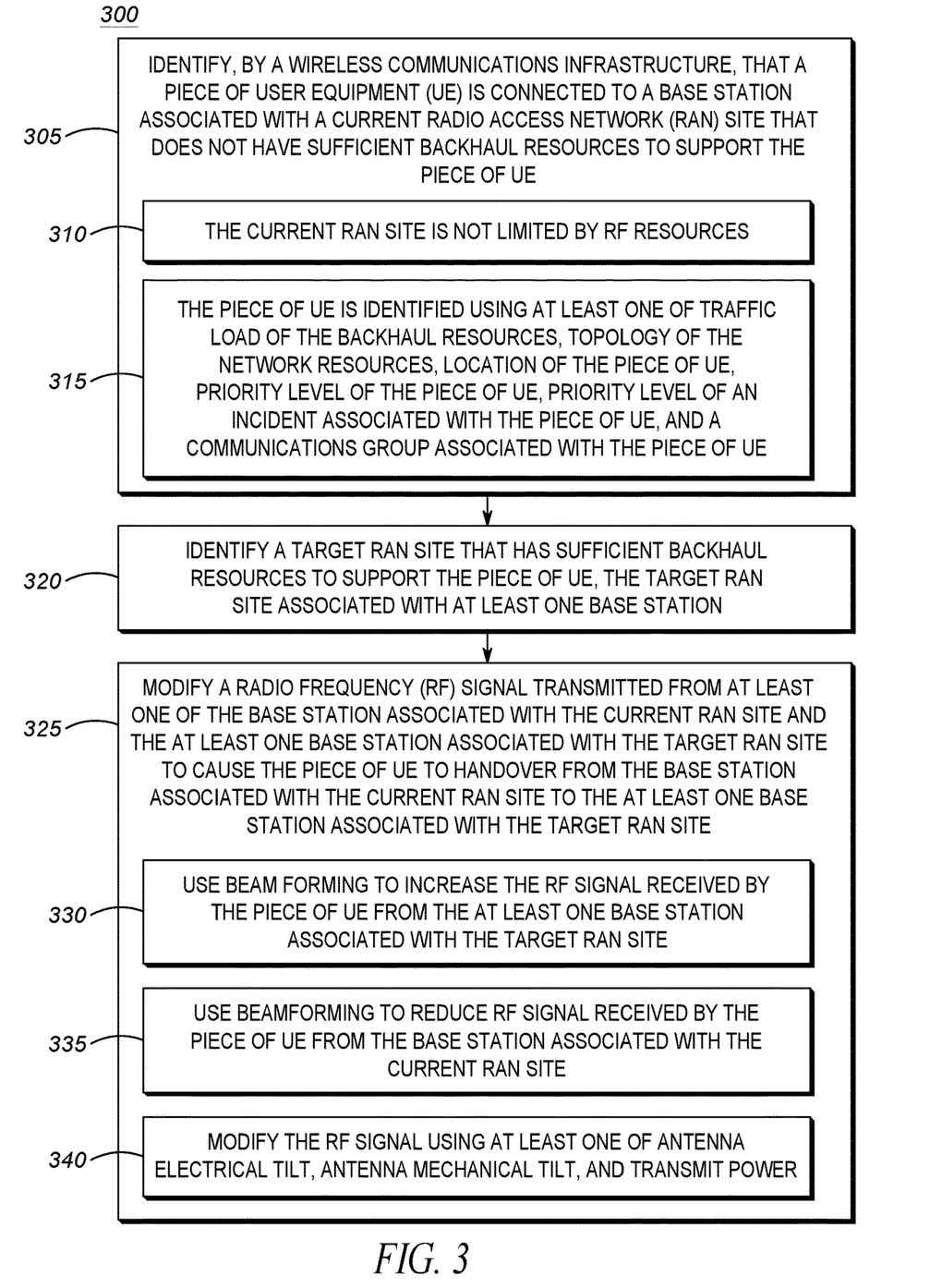
FIG. 3 is an example of a flow diagram illustrating the dynamic optimization of radio access network site techniques described herein.

FIG. 3 is an example of a flow diagram 300 illustrating the dynamic optimization of radio access network site techniques described herein. In block 305, a wireless communications infrastructure may identify that a piece of User Equipment (UE) is connected to a base station associated with a current Radio Access Network (RAN) site that does not have sufficient backhaul resources to support the piece of UE. For example, the AMF/MME function 270 may determine that a particular RAN site that comprises one or more base stations does not have sufficient backhaul resources available to handle the load offered by a piece of user equipment. Not having sufficient backhaul resources does not mean that the piece of UE cannot communicate at all, but rather simply means that the piece of UE can offer more traffic to the core network than the backhaul network is capable of transporting to the core network.

For example, a situation such as this may occur when, in order to reduce costs, backhaul network components are selected that cannot handle the traffic that may be produced by UE connected to the RAN site. For example, in a condition where there is an incident, or some other abnormal event occurring in the coverage area of the RAN site, the RF capacity available may exceed the backhaul resources. Thus, even though the RAN site is able to provide sufficient RF coverage, the backhaul resources are not sufficient to transport traffic from all the UE within the RAN site to the EPC core/5G core via the backhaul network.

In block 310, it should be noted that the current RAN site may not be limited by RF resources. In other words, the RAN site may have sufficient RF resources to remain connected to all pieces of UE within the coverage area of the RAN site from an RF perspective. However, the RAN site may not have sufficient backhaul resources to transfer all the traffic generated by those connected pieces of UE to the core network. In other words, the handover process described below is not initiated due to RF coverage reasons, but rather is due to backhaul capacity reasons.

In block 315 the piece of UE is identified using at least one of traffic load of the backhaul resources, topology of the network resources, location of the piece of UE, priority level of the piece of UE, priority level of an incident associated with the piece of UE, and a communications group associated with the piece of UE. As described above, the UE may be selected because there are insufficient backhaul resources available at the RAN site to send traffic generated by the UE to the core network. In some cases, there may be more than one piece of UE that could be handed over to a different RAN site that has backhaul capacity to service the selected piece of UE.

Many factors may be used in the selection of UE. For example, the available backhaul resources for the target RAN site may be used to select a piece of UE. For example, if a piece of UE could be moved to a new RAN site, but that target RAN site also does not have sufficient backhaul resources, there would be no point in causing the handover to occur. The topology of the network resources may also be a factor in selection of a UE. For example, UE is a 4G device, selection of a 5G RAN site is not appropriate, as the piece of UE would not be able to connect to the target RAN site.

The location of the piece of UE may be another factor. If a piece of UE is located in an area that is only within the coverage area of a single RAN site, it would not be beneficial to select that particular piece of UE, as there would be no target RAN site that could be selected to provide sufficient backhaul resources. Yet another selection criteria may be a priority level of the piece of UE. for example, if there are multiple pieces of UE within a coverage area of a RAN site that is limited by backhaul resource constraints, it may be desirable to select high priority UE (e.g. US associated with higher priority users, etc.) to be moved to a target RAN site with sufficient backhaul resources available.

The identification criteria could also include things such as a priority level of an incident associated with the piece of UE. As explained above, the lack of sufficient resources may have been caused by an incident occurring in the location of the current RAN site. UE that are associated with the incident, when the incident has a high enough priority level, may be selected to be moved to a target RAN site based on their association with the high priority incident. Likewise, a piece of UE may be associated with a high priority communications group. For example, in a public safety environment, supervisors may be in a high priority communications group (e.g. talkgroup), such that their communications are to be given higher priority. Identification of such high priority communications groups, and associated UE may ensure that those higher priority devices have sufficient backhaul resources available. What should be understood is that a UE that could benefit from handover to a RAN site with available backhaul resources is identified. The particular criteria for such selection is relatively unimportant, and can be based on the specific needs of the system that was implemented.

In block 320, a target RAN site that has sufficient backhaul resources to support the piece of UE may be identified. The target RAN site may be associated with at least one base station. As explained above, a RAN site may have multiple base stations (e.g. eNodeB, gNodeB, etc.) that provide RF connectivity, wherein all the base stations of the same RAN site may be supported by a single connection to a backhaul network. A target RAN site that has sufficient backhaul resources to support the piece of UE does not necessarily mean that the target RAN site is able to fully support all traffic offered by the piece of UE. Instead, sufficient backhaul resources means that more backhaul resources are available to serve the piece of UE at the target RAN site than at the current RAN site.

In block 325, a RF signal transmitted from at least one of the base station associated with the current RAN site and the at least one base station associated with the target RAN site may be modified to cause the piece of UE to handover from the base station associated with the current RAN site to the at least one base station associated with the target RAN site. In other words, the RF signal from either the current base station, the target base station, or both are modified to cause the piece of UE to handover from a RAN site with insufficient backhaul resources to a RAN site with sufficient backhaul resources. As explained above, the handover may be due solely to backhaul capabilities of the current and target RAN site, and is not due to actual RF coverage and/or capacity of either the current or target RAN site. Because a UE is only connected to a single base station within a RAN site at any given time, the RF signal from only one of the base stations associated with the target RAN site may be modified. In other words, if a target RAN site has multiple base stations associated with it, the RF signals from a single base station would be modified, to prompt handover to that base station. The RF signals from other base stations associated with the target RAN site could be left unmodified.

In block 330, beamforming may be used to increase the RF signal received by the piece of UE from the at least one base station associated with the target RAN site. In other words, the amount of RF signal received by the piece of UE from the target RAN site may make the target RAN site more desirable for a piece of UE from an RF signal strength perspective. This modification can be done alone, or in combination with modification of the RF signal from the current RAN site.

In block 335, beamforming may be used to reduce the RF signal received by the piece of UE from the base station associated with the current RAN site. In other words, the amount of RF signal received by the piece of UE from the current RAN site may make the current RAN site less desirable for a piece of UE from an RF signal strength perspective. This modification can be done alone, or in combination with modification of the RF signal from the target RAN site.

In block 340 alternative mechanisms to modify the RF signal transmitted from the current or target RAN site may be used. For example, using at least one of antenna electrical tilt, antenna mechanical tilt, and transmit power, the RF signal may be modified. By altering the tilt of the signal (electrically or mechanically) or the transmit power, the RF signal received by the piece of UE will be altered. The modification can make the current RAN site less desirable from an RF perspective or the target RAN site more desirable from an RF perspective, thus triggering a handoff from the current RAN site to the target RAN site.

It should also be understood that combinations of any of the previously described techniques may be used. For example, the RF signal from the current base station may be modified by adjusting antenna electrical tilt, while the RF signal from the target RAN site may be modified using beamforming. What should be understood is that any techniques that cause the target RAN site to be more desirable from a RF perspective than the current RAN site may be utilized with the techniques described herein.

Figure 4:
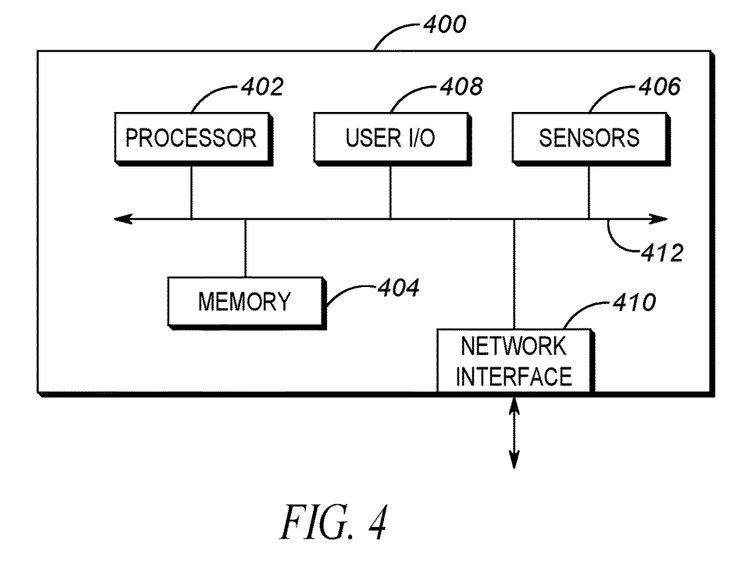
FIG. 4 illustrates a block diagram of a communication device in accordance with some embodiments.

FIG. 4 illustrates a block diagram of a communication device 400 in accordance with some embodiments. In some embodiments, communication device 400 may be a personal device, such as a UE, or a network device, such as one or more of those described in relation to FIG. 1 (e.g., a gNB, an eNB, or other equipment used in the network environment). Communication device 400 may include a physical device and/or a virtual device, such as a server running one or more virtual network functions (VNFs) of the network shown in FIG. 1. In various examples, communication device 400 may be a specialized computer, a personal or laptop computer (PC), a tablet PC, a mobile telephone, a smartphone, a network router, switch or bridge, or any machine capable of executing instructions (sequential or otherwise) that specify actions to be taken by that machine. In some embodiments, communication device 400 may be an internet-of-things (IOT) or a narrowband IoT (NB-IOT) device or other device embedded within other, non-communication-based devices such as appliances or vehicles.

Communication device 400 may include various components connected by a bus 412. Communication device 400 may include a hardware processor 402 such as one or more central processing units (CPUs) or other processing circuitry able to provide any of the functionality described herein when running instructions. Processor 402 may be connected to a memory 404 may include a non-transitory machine-readable medium on which is stored one or more sets of instructions. Memory 404 may include one or more of static or dynamic storage, or removable or non-removable storage, for example. A machine-readable medium may include any medium that is capable of storing, encoding, or carrying instructions for execution by processor 402, such as solid-state memories, magnetic media, and optical media. Machine-readable medium may include, for example, Electrically Programmable Read-Only Memory (EPROM), Random Access Memory (RAM), or flash memory.

The instructions may enable communication device 400 to operate in any manner thus programmed, such as the functionality described specifically herein, when processor 402 executes the instructions. The machine-readable medium may be stored as a single medium or in multiple media, in a centralized or distributed manner. In some embodiments, instructions may further be transmitted or received over a communications network via a network interface 410 utilizing any one of a number of transfer protocols (e.g., frame relay, internet protocol (IP), transmission control protocol (TCP), user datagram protocol (UDP), hypertext transfer protocol (HTTP), etc.).

Network interface 410 may thus enable communication device 400 to communicate data and control information with other devices via wired or wireless communication. Network interface 410 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHZ range, 1.8-1.9 GHz range, 2.3-2.4 GHz range, 60 GHz range, and others, including infrared (IR) communications. Example communication networks to which communication device 400 may be connected via network interface 410 may include a local area network (LAN), a wide area network (WAN), a packet data network (e.g., the Internet), mobile telephone networks (e.g., cellular networks), and wireless data networks. Communication device 400 may be connected to the networks via one or more wired connectors, such as a universal serial bus (USB), and/or one or more wireless connections, and physical jacks (e.g., Ethernet, coaxial, or phone jacks) or antennas.

Communication device 400 may further include one or more sensors 406, such as one or more of an accelerometer, a gyroscope, a global positioning system (GPS) sensor, a thermometer, a magnetometer, a barometer, a pedometer, a proximity sensor, and an ambient light sensor, among others. Sensors 406 may include some, all, or none of one or more of the types of sensors above (although other types of sensors may also be present), as well as one or more sensors of each type.

Sensors 406 may be used in conjunction with one or more user input/output (I/O) devices 408. User I/O devices 408 may include one or more of a display, a camera, a speaker, a keyboard, a microphone, a mouse (or other navigation device), or a fingerprint scanner, among others. User I/O devices 408 may include some, all, or none of one or more of the types of I/O devices above (although other types of I/O devices may also be present), as well as one or more I/O devices of each type.

Communication device 400 may include different specific elements depending on the particular device. For example, although not shown, in some embodiments communication device 400 may include a front end that incorporates a millimeter and sub-millimeter wave radio front end module integrated circuit (RFIC) connected to the same or different antennae. The RFICs may include processing circuitry that implements processing of signals for the desired protocol (e.g., medium access control (MAC), radio link control (RLC), packet data convergence protocol (PDCP), radio resource control (RRC) and non-access stratum (NAS) functionality) using one or more processing cores to execute instructions and one or more memory structures to store program and data information. The RFICs may further include digital baseband circuitry, which may implement physical layer functionality (such as hybrid automatic repeat request (HARQ) functionality and encoding/decoding, among others), transmit and receive circuitry (which may contain digital-to-analog and analog-to-digital converters, up/down frequency conversion circuitry, filters, and amplifiers, among others), and RF circuitry with one or more parallel RF chains for transmit/receive functionality (which may contain filters, amplifiers, phase shifters, up/down frequency conversion circuitry, and power combining and dividing circuitry, among others), as well as control circuitry to control the other RFIC circuitry.

As indicated above, one or more of the network devices shown in FIG. 1 may be implemented, not by physical implementations, but by VNFs. VNFs have taken on increasing significance due to the increasing complexity of the 5G network. In particular, it may be costly or difficult, at best, to update or replace physical network devices when the functionality of the network devices (such as the mobility management entity (MME) and serving and packet data gateways in LTE and 5G architectures and the AMF and SMF in 5G architectures) is to be altered. Software may thus be used to permit general purpose computers in a centralized or distributed manner to provide one or more network functions as one or more VNFs of a Network Function Virtualization (NFV) architecture. The NFV architecture may support multiple independent networks (slices) that may each contain all of the functionality available in the NFV architecture.

Figure 5:
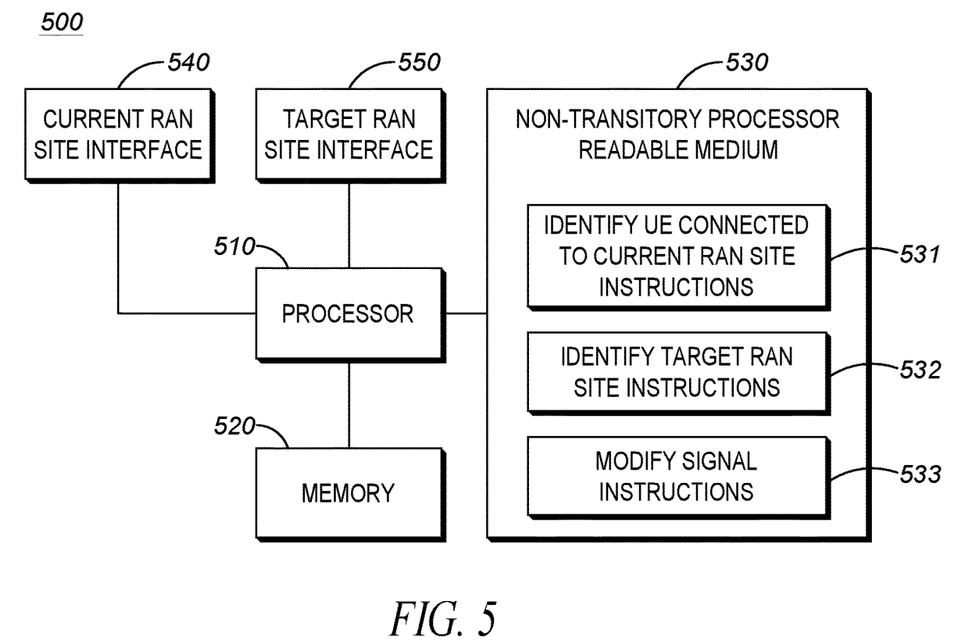
FIG. 5 illustrates an example computing device usable within a wireless communications infrastructure that may implement the techniques described herein.

FIG. 5 is an example of a device 500 that may implement the dynamic optimization of radio access network site techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. RF signal modification based on backhaul resources, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, current RAN site interface 540, and target RAN site interface 550. Device 500 may implement, for example, the AMF/MME 270 functionality.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include identify UE connected to current RAN site instructions 531. The identify UE connected to current RAN site instructions 531 may cause the processor to identify a UE that is connected to a current RAN site that does not have sufficient backhaul resources available to support the piece of UE. For example, the processor may utilize the current RAN site interface 540 to gather information about the current RAN site, such as the available backhaul resources. The identify UE connected to current RAN site instructions 531 are described throughout this description generally, including places such as the description of blocks 305-315.

The medium 530 may include identify target RAN site instructions 532. The identify target RAN site instructions 532 may cause the processor to identify a target RAN site that has a RF coverage area that includes the UE and also has sufficient backhaul resources to support the UE. For example, the processor may utilize the target RAN site interface 550 to gather information about the target RAN site, such as the available backhaul resources. The identify target RAN site instructions 532 are described throughout this description generally, including places such as the description of block 320.

The medium 530 may include modify RF signal instructions 533. The modify RF signal instructions 533 may cause the processor to instruct the base stations associated with the current and/or target RAN site to modify RF signals to induce a handover of the UE from the current RAN site to the target RAN site. For example, the processor may utilize the current RAN site interface 540 and/or the target RAN site interface 550 to instruct the associated base stations to modify the RF signal being produced by the base stations to initiate a handover from the current RAN site to the target RAN site. The modify RF signal instructions 533 are described throughout this description generally, including places such as the description of blocks 325-340.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot modify RF signals from a current or target RAN site to initiate a handover based on backhaul resources, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   identifying, by a wireless communications infrastructure, that a piece of User Equipment (UE) is connected to a base station associated with a current Radio Access Network (RAN) site that does not have sufficient backhaul resources to support the piece of UE;
   identifying a target RAN site that has sufficient backhaul resources to support the piece of UE, the target RAN site associated with at least one base station; and
   modifying a Radio Frequency (RF) signal transmitted from at least one of the base station associated with the current RAN site and the at least one base station associated with the target RAN site to cause the piece of UE to handover from the base station associated with the current RAN site to the at least one base station associated with the target RAN site.

2. The method of claim 1 wherein the modifying the RF signal comprises:
   using beamforming to reduce RF signal received by the piece of UE from the base station associated with the current RAN site.

3. The method of claim 1 wherein the modifying the RF signal comprises:
   using beamforming to increase the RF signal received by the piece of UE from the at least one base station associated with the target RAN site.

4. The method of claim 1 wherein the modifying the RF signal comprises:
   using beamforming to reduce RF signal received by the piece of UE from the base station associated with the current RAN site; and
   using beamforming to increase the RF signal received by the piece of UE from the at least one base station associated with the target RAN site.

5. The method of claim 1 wherein the piece of UE is identified using at least one of traffic load of the backhaul resources, topology of the network resources, location of the piece of UE, priority level of the piece of UE, priority level of an incident associated with the piece of UE, and a communications group associated with the piece of UE.

6. The method of claim 1 wherein the modifying the RF signal comprises at least one of antenna electrical tilt, antenna mechanical tilt, and transmit power.

7. The method of claim 1 wherein the current RAN site is not limited by RF resources.

8. A system comprising:
a processor; and
a memory coupled to the processor, the memory containing a set of instructions thereon that when executed by the processor cause the processor to:
identify, by a wireless communications infrastructure, that a piece of User Equipment (UE) is connected to a base station associated with a current Radio Access Network (RAN) site that does not have sufficient backhaul resources to support the piece of UE;
identify a target RAN site that has sufficient backhaul resources to support the piece of UE, the target RAN site associated with at least one base station; and
modify a Radio Frequency (RF) signal transmitted from at least one of the base station associated with the current RAN site and the at least one base station associated with the target RAN site to cause the piece of UE to handover from the base station associated with the current RAN site to the at least one base station associated with the target RAN site.

9. The system of claim 8 wherein the modifying the RF signal comprises instructions to:
use beamforming to reduce RF signal received by the piece of UE from the base station associated with the current RAN site.

10. The system of claim 8 wherein the modifying the RF signal comprises instructions to:
use beamforming to increase the RF signal received by the piece of UE from the at least one base station associated with the target RAN site.

11. The system of claim 8 wherein the modifying the RF signal comprises instructions to:
use beamforming to reduce RF signal received by the piece of UE from the base station associated with the current RAN site; and
use beamforming to increase the RF signal received by the piece of UE from the at least one base station associated with the target RAN site.

12. The system of claim 8 wherein the piece of UE is identified using at least one of traffic load of the backhaul resources, topology of the network resources, location of the piece of UE, priority level of the piece of UE, priority level of an incident associated with the piece of UE, and a communications group associated with the piece of UE.

13. The system of claim 8 wherein the modifying the RF signal comprises at least one of antenna electrical tilt, antenna mechanical tilt, and transmit power.

14. The system of claim 8 wherein the current RAN site is not limited by RF resources.

15. A non-transitory processor readable medium containing a set of instructions thereon that when executed by a processor cause the processor to:
identify, by a wireless communications infrastructure, that a piece of User Equipment (UE) is connected to a base station associated with a current Radio Access Network (RAN) site that does not have sufficient backhaul resources to support the piece of UE;
identify a target RAN site that has sufficient backhaul resources to support the piece of UE, the target RAN site associated with at least one base station; and
modify a Radio Frequency (RF) signal transmitted from at least one of the base station associated with the current RAN site and the at least one base station associated with the target RAN site to cause the piece of UE to handover from the base station associated with the current RAN site to the at least one base station associated with the target RAN site.

16. The medium of claim 15 wherein the modifying the RF signal comprises instructions to:
use beamforming to reduce RF signal received by the piece of UE from the base station associated with the current RAN site.

17. The medium of claim 15 wherein the modifying the RF signal comprises instructions to:
use beamforming to increase the RF signal received by the piece of UE from the at least one base station associated with the target RAN site.

18. The medium of claim 15 wherein the modifying the RF signal comprises instructions to:
use beamforming to reduce RF signal received by the piece of UE from the base station associated with the current RAN site; and
use beamforming to increase the RF signal received by the piece of UE from the at least one base station associated with the target RAN site.

19. The medium of claim 15 wherein the piece of UE is identified using at least one of traffic load of the backhaul resources, topology of the network resources, location of the piece of UE, priority level of the piece of UE, priority level of an incident associated with the piece of UE, and a communications group associated with the piece of UE.

20. The medium of claim 15 wherein the modifying the RF signal comprises at least one of antenna electrical tilt, antenna mechanical tilt, and transmit power.

* * * * *